Jan. 28, 1941. G. M. POMEROY Re. 21,702
FRONT FORK FOR VEHICLES
Original Filed April 19, 1935
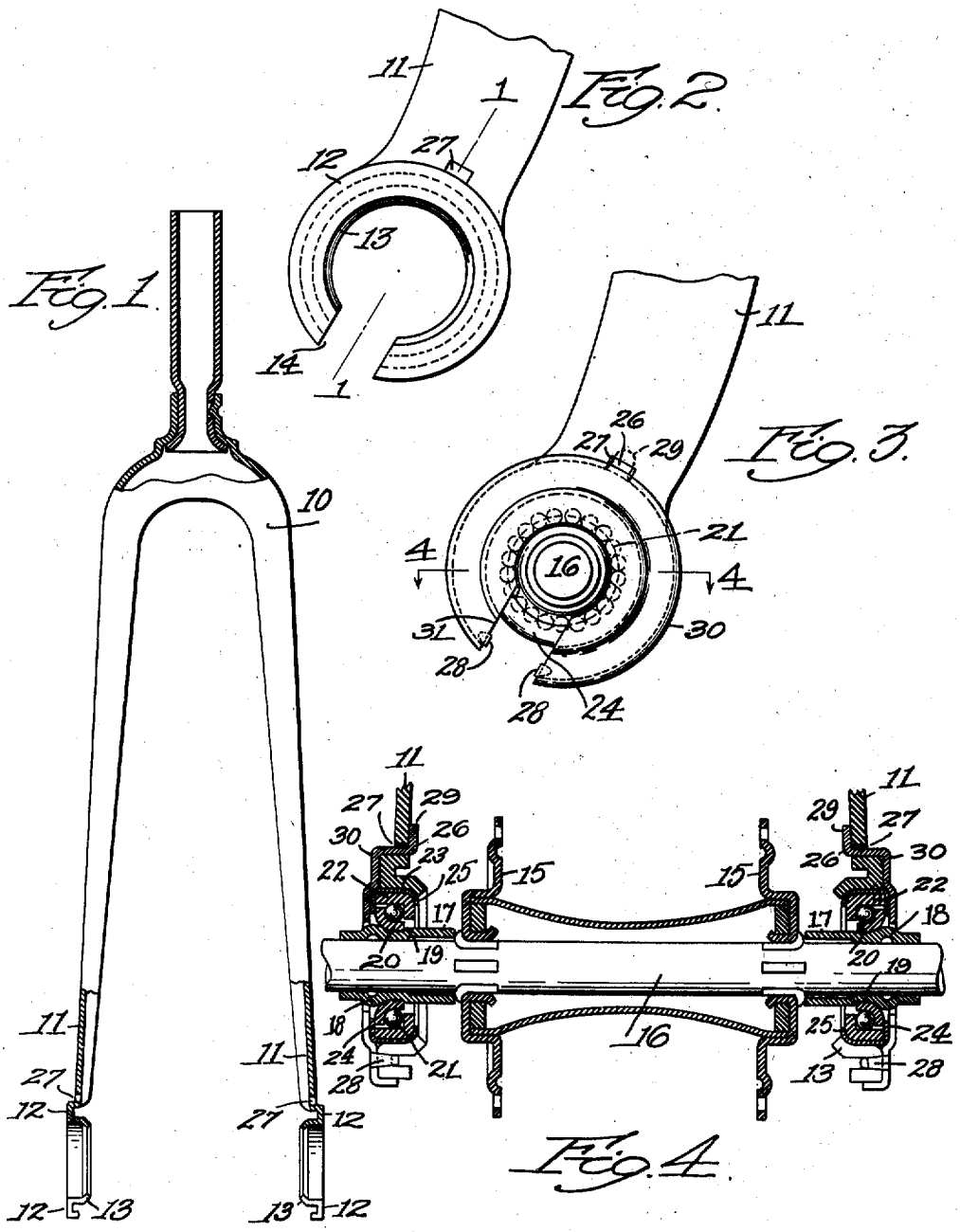
Inventor
Glendon M. Pomeroy
By attorneys
Southgate & Henley Reissued Jan. 28, 1941

Re. 21,702

UNITED STATES PATENT OFFICE 21,702

FRONT FORK FOR VEHICLES

Glendon M. Pomeroy, Worcester, Mass., assignor to Matthews Manufacturing Company, Worcester, Mass., a corporation of Massachusetts Original No. 2,018,973, dated October 29, 1935, Serial No. 17,284, April 19, 1935. Application for reissue February 29, 1940, Serial No. 321,570

3 Claims. (Cl. 308—178)

This invention relates to a front fork for tricycles, bicycles and other two or three wheel vehicles.

The principal objects of the invention are to provide a simple construction by which the shaft of the front wheel together with its bearings can be assembled in and secured to the fork in a minimum of time; to provide means for accurately supporting the bearings for the shaft in spite of the fact that the bearing housing is not continuous; to provide a simple means all in one piece for fixing the races of the ball bearing in the housing and to provide a construction which will be rigid and durable for accurately and freely supporting the wheel shaft.

Other objects and advantages of the invention will appear hereinafter.

Reference is to be had to the accompanying drawing, in which

Fig. 1 is a front elevation of a front fork constructed in accordance with this invention, shown partly in section on the line 1—1 of Fig. 2, before the parts are assembled;

Fig. 2 is a side view of the sectioned part of the same on enlarged scale.

Fig. 3 is a side view with the parts assembled, and

Fig. 4 is a sectional view of the same on the line 4—4 of Fig. 3.

Forks for this general purpose have been manufactured for many years and it has been a time consuming job to put the wheel shaft through the housing at the lower end of the fork, apply the wheel, center the shaft and fix the bearing races in proper place and in rigid condition. Most of the old constructions also have been subject to wear, inducing looseness at one end or the other and rendering the wheel wobbly. It has been very difficult to anchor the outer race of the ball bearing properly in permanent position. These difficulties are overcome by the present invention.

The fork or frame 10 is made with two legs 11, as usual, of pressed steel, malleable iron, or the like. At the bottom of each leg there is an annulus 12 which, as will appear, does not extend throughout the full circle. This annular portion, of course, is integral with the leg 11 and it is provided with a conical open-ended portion 13 on the inside integral with the annulus and constituting an inturned edge. At one side of the bottom but not exactly at the bottom, is a radial slanting slot 14 all the way through the parts 12 and 13 for the purpose of admitting the shaft of the wheel.

The wheel hub 15, as usual, is fixed on the wheel shaft 16. Beyond the hub at each end this shaft is adapted to have placed thereon a sleeve 17, the said sleeves carrying the ball bearings by which the shaft is rotatively mounted in the two housing portions 12, 12 of the fork 10. Each ball bearing comprises a series of balls 21, 21 arranged between an inner race 20 and an outer race 22, the latter being surrounded by a casing 23 of sheet metal which is bent over at one end at 24 so as to hold the inner race in position, and which is bent over at the opposite end at 25 to anchor it to the outer race. Each ball bearing assembly may be fixed in position on its sleeve 17, as by means of circular bosses 18 and 19 of said sleeve, engaging the inner race 20 of the ball bearing.

The entire shaft and bearings assembly, as above described, can be readily positioned in the fork housings 12, 12 because the latter's slots 14, 14, either when the sleeves 17 are slid axially a little distance, or when one or both of the legs 11 is slightly sprung, permit radial inward movement therethrough of the shaft portions immediately adjacent the ball bearings. Thus the latter can be brought into axial alinement with the housing portions 12, 12 so as to slip into position therein, as shown in Fig. 4. As so assembled, the end of each ball bearing at 25 comes up against the conical portion 13, which serves to limit its movement in that direction. To complete the assembly, and to limit bearing movement in the other direction, I provide the two caps 30, 30 which are placed over the ends of the housings 12, 12. Each cap is shown as having a radial slot 31 to register with the slot 14. Each cap engages the annulus 12 throughout a large part of its surface. A tongue 26 on the cap is inserted in a slot 27 in the leg 11 and then two tongues 28 on the opposite sides of the slot 14 are pressed down along the sides of this slot and bent outwardly in opposite directions. The tongue 26 is bent upwardly as shown at 29. This anchors the cap in position on the leg and thus the two caps serve to lock the shaft bearings securely within the housings provided by the ends of the legs 11, 11. One of the tongues is inserted freely and the others are snapped in with the aid of a hammer and all three of them bent over with a hammer or in any other desired way.

This constitutes an extremely simple holding device for the ball bearing and one that will give no chance for wearing with considerable usage. The parts are not likely to get out of order in any way and the whole construction is anchored together in the proper position without the difficulty of passing the shaft longitudinally through one or both of the housings.

Having thus described my invention and the advantages thereof, I do not wish to be limited to the details herein disclosed, otherwise than as set forth in the claims, but what I claim is:

1. A vehicle fork assembly comprising a shaft, a wheel secured to said shaft at an intermediate portion of its length, assembled anti-friction bearings for the journalling of said shaft applied thereto on opposite sides of said wheel, a fork member having two legs between which said wheel is receivable, each of said legs terminating in a substantially annular housing, said housings, in alined relation for the reception of said bearings, being spaced apart by less than the length of said shaft and each having an inturned integral flange against which one end of the associated bearing is adapted to abut in the assembled condition of said parts, the wall of each housing having a slot of slightly greater width than the shaft diameter, and said bearings being slidable endwise on said shaft, thereby permitting said shaft, when said bearings are offset endwise from said housings, to be entered radially through said slots to dispose said bearings in concentric relation to said housings for entry into same by endwise movement on said shaft.

2. A vehicle fork assembly comprising a shaft, a wheel secured to said shaft at an intermediate portion of its length, assembled anti-friction bearings for the journalling of said shaft applied thereto on opposite sides of said wheel, a fork member having two legs between which said wheel is receivable, each of said legs terminating in a substantially annular housing, said housings, in alined relation for the reception of said bearings, being spaced apart by less than the length of said shaft and each having an inturned integral flange against which one end of the associated bearing is adapted to abut in the assembled condition of said parts, the wall of each housing having a slot of slightly greater width than the shaft diameter, and said bearings being slidable endwise on said shaft, thereby permitting said shaft, when said bearings are offset endwise from said housings, to be entered radially through said slots to dispose said bearings in concentric relation to said housings, for entry into same by endwise movement on said shaft, and a cap detachably engaged with each housing, after movement of its associated bearing into same, for retaining said bearing therein.

3. A vehicle fork assembly comprising a shaft, a wheel secured to said shaft at an intermediate portion of its length, and assembled anti-friction bearings for the journalling of said shaft applied thereto on opposite sides of said wheel, in combination with a fork member having two legs between which said wheel is receivable, each of said legs terminating in a substantially annular housing, said housings, in alined relation for the reception of said bearings being spaced apart by less than the length of said shaft, and each having integral means opposing endwise movement in one direction of its associated bearing in the assembled condition of said parts, the wall of each housing having a slot slightly wider than the shaft diameter, for the radial entry of said shaft into said housings, when said bearings on said shaft are offset endwise from said housings, and a cap member for detachable connection to each housing after its respective bearing has been positioned endwise therein to oppose endwise movement of the associated bearing in the other direction.

GLENDON M. POMEROY.